United States Patent

[11] 3,617,720

[72] Inventor William M. Gentleman
Summit, N.J.
[21] Appl. No. 667,113
[22] Filed Sept. 12, 1967
[45] Patented Nov. 2, 1971
[73] Assignee Bell Telephone Laboratories, Incorporated
Murray Hill, N.J.

[54] FAST FOURIER TRANSFORM USING HIERARCHICAL STORE
10 Claims, 1 Drawing Fig.

[52] U.S. Cl. .......... 235/156, 324/77
[51] Int. Cl. .......... G06f 7/38
[50] Field of Search .......... 235/156, 159, 160, 164, 152; 340/172.5; 324/77

[56] References Cited

UNITED STATES PATENTS 3,400,259 9/1968 Maczko et al. .......... 235/156

OTHER REFERENCES

Cooley, An Algorithm For The Machine Calculation of Complex Fourier Series, April 1965, pp. 297-301

Gentleman, Fast Fourier Transforms-For Fun and Profit, Fall '66, pp. 563-578

Singleton, A Method for Computing the Fast Fourier Transform with Auxiliary Memory and Limited High-Speed Storage, June '67, pp. 91-98

*Primary Examiner*—Malcolm A. Morrison
*Assistant Examiner*—David H. Malzahn
*Attorneys*—R. J. Guenther and William L. Keefauver

ABSTRACT: Methods and apparatus for performing fast Fourier transforms corresponding to a sequence of input data signals are described. Efficient allocation and buffering of a small high-speed memory within a hierarchical memory system permits computations to proceed at a rate approximating that available with a single large store operating at the speed of the high-speed memory.

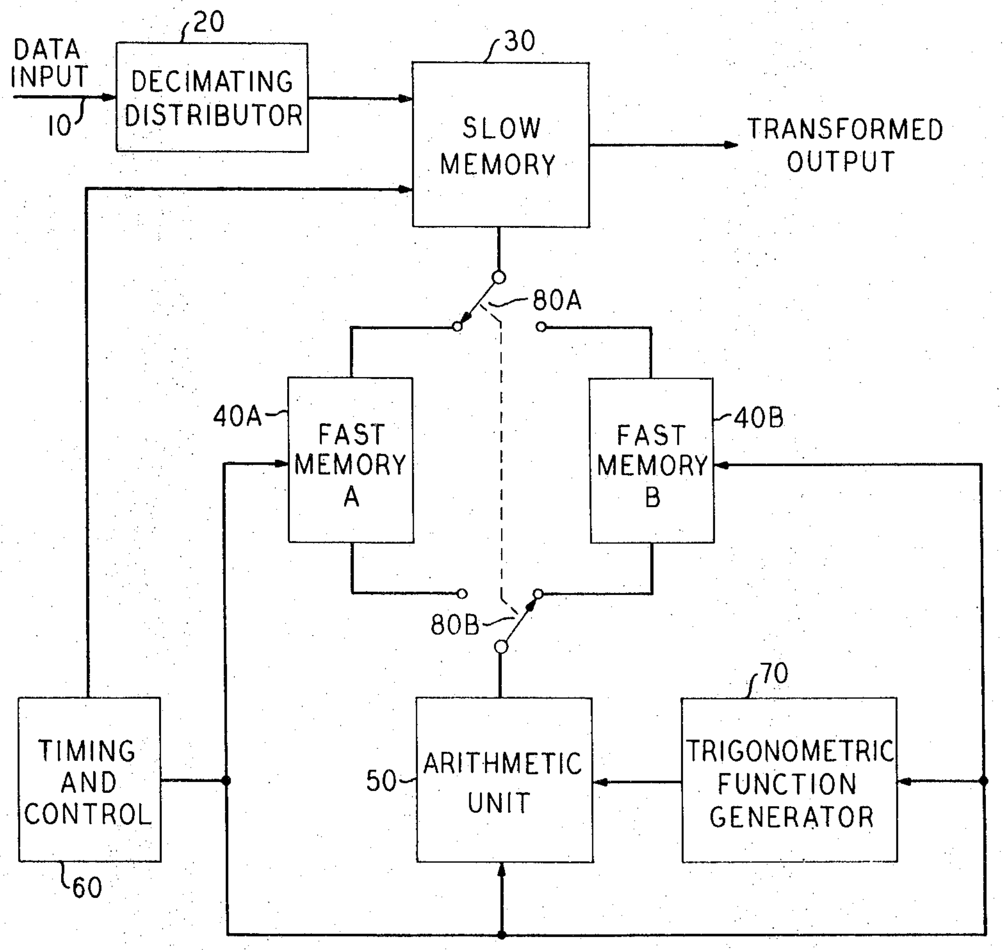
INVENTOR
W. M. GENTLEMAN
BY R.O. Nimtz
ATTORNEY

FAST FOURIER TRANSFORM USING HIERARCHICAL STORE

This invention relates to methods and apparatus for analyzing the spectral content of complex signals. More particularly this invention relates to methods and improved apparatus for performing fast Fourier transforms (FFT). Still more particularly, the present invention relates to methods and apparatus for increasing the speed of FFT analysis in a system having a plurality of storage media with varying access times.

An algorithm for the computation of Fourier coefficients which requires considerably less computational effort than was required in the past was reported by Cooley and Tukey in a paper entitled "An Algorithm for the Machine Calculation of Complex Fourier Series," *Math. of Comput.*, Vol. 19, pp. 297–301, Apr. 1965. This method is now widely known as the "Fast Fourier Transform" (FFT) and has produced major changes in computational techniques used in digital spectral analysis and related fields.

The importance of the FFT techniques lies in the fact that it reduces the number of computations, i.e., multiplications and additions, necessary to perform spectral analysis of a sequence of data samples. Typically, the number of multiplications required by the FFT method is of the order of $2N\log_2 N$ whereas classical (direct) Fourier transforms required of the order of $N^2$ such computations. Thus, in many cases the number of computations and hence the time for performing these computations has been decreased by an order of magnitude or more.

The many applications for these FFT techniques have been described for example by T. J. Stockham in his paper entitled "High Speed Convolution and Correlation," 1966 *SJCC, AFIPS Proc.*, Vol. 28, Washington, D.C.: Spartan Books, 1966, pp. 229–233, and by Gentleman and Sande "Fast Fourier Transforms for Fun and Profit" 1966 *Fall Joint Computer Conference, AFIPS Proc.*, Vol. 29, Washington, D.C.: Spartan, 1966, pp. 563–578. Apparatus and methods for performing FFT analyses have also been described in copending applications by M. J. Gilmartin, Jr. and R. R. Shively, Ser. No. 605,768, now U.S. Pat. No. 3,517,173 and G. D. Bergland and R. Klahn, Ser. No. 605,791 filed Dec. 29, 1966, assigned to applicant's assignee.

It is often required to perform spectral analyses on very large amounts of data. For example, telemetry data returned from an earth satellite or space vehicle representing environmental or other conditions may be received at a very high rate. Typically, up to several million sample values may be contained in a single record. Further, data may be received on a continuing high-speed basis in some applications. It is desirable to perform spectral analyses on these data in as short a time as possible, often in real time.

While the FFT techniques have greatly increased the ability to handle such high-speed spectrum analyses even these techniques may fail in extreme cases. This is particularly due to the lack of very large high-speed memories to store the data while they are being processed. Typically, data records containing more than about $10^5$ sample values must be stored in some bulk media such as magnetic tape, disk, or drum storage unit. Occasionally very large, but relatively slow, auxiliary core memories are available for large scale storage. While computations within an FFT computer may proceed in high-speed bursts, the time needed to transfer data from the bulk media to the internal high-speed stores of the computer itself proves to be the limiting factor in attempting to achieve high-speed analyses.

While one group of computers, of which the well-known Atlas machine (described, for example, in T. Kilburn et "One-Level Storage System," *IRE Trans., Electronic Computer*, Apr. 1962) is representative, have been organized to provide storage for large amounts of data in what appears to be a single large store, such organizations in reality have a hierarchy of stores with appropriate programmed interaction between them. Such one-class "virtual" storage thus provides a computer user with the equivalent of a large memory, but at a price. The price paid is, of course, reduced average access time when dealing with large amounts of data. One cannot avoid the fact that the use of slower levels of memory result in a longer average time to perform a memory cycle that if the internal high-speed memory were used exclusively.

Many modern computers are arranged to provide for sharing of computer memory and arithmetic facilities between a plurality of users. For these purposes memory is often arbitrarily divided into segments or pages, each reserved for a particular user. While such segmentation may be dynamically assigned there nevertheless remain constraints on access by a given user at any given time. Such segmentation often results in memory overflows, thereby providing to be a stumbling block when large amounts of data are required in a short period of time, as in the FFT analyses mentioned above. Thus, many of the techniques used in modern computer technology imply limitations on the performance of an FFT analysis algorithm.

Another element in many modern computers is a very fast memory of limited capacity. Such memories, often referred to as scratch pad or temporary memories, are typically made up of high-speed semiconductor elements such as tunnel diodes, or high-speed magnetic film devices. Because of their large elemental cost, a very large array of such memory elements cannot economically be provided. While intended primarily for bookkeeping and other control functions in most general purpose machines, scratch pad stores can be made available for general computation in some cases. Of course when scratch pad memories are designed into special purpose machines, they can easily be made available for general computation. Such stores, when combined with high speed logical elements, are able to perform arithmetic operations at a speed far in excess of combinations involving slow bulk stores or even the ordinary main memory of most computers.

The present invention provides techniques for taking full advantage of the FFT algorithm in a computer system having a hierarchical memory system without encountering any of the limitations of such systems. That is, using the techniques of the present invention, FFT analyses may be performed on large amounts of data at a speed limited only by the access time of the highest speed memory in the hierarchy.

Briefly stated, the present invention provides Fourier analysis for a large block of data by decimating the original block of data into smaller blocks of data, each of which may be stored in turn in the high-speed memory of a computer. Analysis of each smaller block is performed separately. The results of each of these analyses are then returned at high speed to a large memory wherein all but the current small block of data are stored. After each small block has been analyzed they are then combined using the teachings of the FFT algorithm. Using the present invention with appropriate buffering between the hierarchical elements of the memory, the total analysis is performed in little or no more time than if a high-speed memory capable of storing all of the original input data had been available.

These and other aspects of the present invention will be described below with the aid of the attached drawing wherein:

The FIGURE shows a simplified embodiment of the present invention involving a two level memory system.

BASIC FFT TECHNIQUES

The well-known Fourier transform $\hat{X}(\hat{t})$ corresponding to a function $X(t)$ specified at N discrete values of $t$ is given by $$\hat{X}(\hat{t})=\sum_{t=0}^{N-1} X(t)e\left(\frac{t\hat{t}}{N}\right) \qquad (1)$$

where $e(X)=\exp(2\pi iX)$ and $i^2=-1$.

According to one formulation of the FFT technique, $N$ is chosen to have factors A and B so that $N=AB$. With $\hat{t}=\hat{a}+\hat{b}A$ and $t=b+aB$, where $a$, $\hat{a}=0,1,\ldots,A-1$ and $b$, $\hat{b}=0,1,\ldots,B-1$, and using well3known properties of the exp function, $\hat{X}(\hat{t})$ may be written as $$\hat{X}(\hat{t}) = X(\hat{a}+\hat{b}A) = \sum_{b=0}^{B-1} e\left(\frac{b\hat{b}}{B}\right) Z_{\hat{a}}(b) \qquad (2)$$

where $$Z_{\hat{a}}(b) = e\left(\frac{\hat{a}b}{AB}\right)\left\{\sum_{a=0}^{A-1} e\left(\frac{a\hat{a}}{A}\right) W_b(a)\right\} \qquad (3)$$

and the $B$ different sequences $W_b(a)$ are defined by $W_b(a)=X(b+aB)$, $a=0,1,\ldots,A-1$. (4)

The bracketed expression in eq. (3) is seen to be a Fourier transform itself, although for a shorter sequence of nonconsecutive values of $X(t)$. In fact, this expression is a transform corresponding to a subsequence obtained by starting with the $b$th element ($b=0,1$ $B-1$) of the original input sequence and then selecting every $B$th succeeding element. The formation of subsequences in this manner is known as decimating the original sequence by $B$. The factor $e\left(\frac{\hat{a}b}{AB}\right)$ in eq. (3) is commonly referred to as a "twiddle factor."

The transformation indicated above has the useful property when implemented on a digital machine including a memory and an arithmetic unit, that operands once used for a short sequence of operations, need not be retained. Since there is a one-to-one correspondence between the number of input data points and the number of transformed results, no additional storage need be provided for results. That is, results can overwrite the input data or intermediate data from which they were derived.

One unfortunate characteristic of the FFT techniques is that if data are presented in order of increasing untransformed variable, e.g., time, the transformed results will not be generated and stored in order of increasing transformed variable, e.g., frequency. Thus, a certain amount of well-defined "unscrambling"of transformed results must be performed. Thus, unscrambling of results can be performed at any one of several points in the analysis and represents a rather small portion of the computational effort.

The transformation given in eq. (2) can thus be considered to involve at least the four steps of 1. transforming the decimated subsequences given by eq. (4),
2. multiplying each transform function value by an appropriate twiddle factor given in eq. (3), and
3. performing the transform according to eq. (2) on data resulting from step 2,
4. unscrambling results.

A more detailed description of the analysis, not strictly essential to an understanding of the present invention, is presented in W. M. Gentleman and G. Sande, supra.

HIGH SPEED FFT USING HIERARCHICAL STORE

One embodiment of the present invention will now be described in detail. It will be assumed that a data record of very large size, say a $2^{18}$ point sequence, is presented for analysis by FFT techniques. Each point refers to, in general, a complex number. This quantity of data far exceeds the normal main memory capacity of most general purpose computers. Further, a special purpose FFT computer is typically even more limited in storage capacity.

Since the FFT techniques outlined above require that the entire record be accessible for arithmetic operations in accordance with eq. (2), some kind of large scale store such as auxiliary core or magnetic tape or disk must be provided to store the bulk of the input data and intermediate results during analysis. Thus, according to prior art techniques, including virtual memory techniques, only some of the data required for arithmetic operations at any given time may be in the fast main memory, while other such data will be in the relatively slower bulk stores. The result is that the average time to access data to be operated on by the arithmetic units is increased considerably relative to the access time of the main memory; the speed of the FFT analysis suffers accordingly. The present invention provides means whereby the analysis is pursued at a speed essentially equal to that provided by a single large store operating at the high speed of the main or faster memory.

FIG. 1 shows one organization capable of implementing the present invention. Data are presented for analysis on lead 10. Decimating distributor 20 selects every $B$th complex number to form the $B$ sequences $W_b(a)$ given by eq. (4). This operation may be performed in some cases by operating on serial input data with a serial-to-parallel converter of well-known design.

Slow memory 30 is the means used for storing the bulk of the input data and intermediate results during analysis. Fast memories 40A and 40B store the data actually being operated on by arithmetic unit 50 in accordance with eq. (2). Timing and control circuit 60 provides clock signals, counting and similar bookkeeping operations.

While memories 30 and 40 are designated "slow" and "-fast" respectively, they may both be fast in an absolute sense. For example, when "slow" memory 30 is an auxiliary core memory it may have an access time that is quite fast relative to other "slow" stores such as magnetic tapes. The important advantages of the present invention are realized, however, when "fast" memories 40 are relatively faster than memory 30. In all cases "fast" and "slow" refer to the rapidity with which arithmetic unit 50 can gain access to data stored in the respective memories.

Fast memories 40A and 40B may advantageously be separate parts of a larger memory; the division has been made for simplicity of description. Also, memories 40A and 40B may in some cases actually be part of a main memory containing among other things a program for controlling timing and control circuit 60 and arithmetic unit 50. It will be assumed for the present discussion that each of the memories 40A and 40B are limited by physical or program considerations to a fixed number of locations, say $2^{12}=4{,}096$.

Trigonometric function generator 70 provides the trigonometric function values required by the arithmetic operations implied by eqs. (2), (3), (4). These values may be generated as required by well-known function generating techniques or may be stored in a memory and selectively accessed as required.

Arithmetic unit 50 may be a general purpose arithmetic unit programmed to carry out the arithmetic operations indicated by eqs. (2–4). Alternately, arithmetic unit 50 may be a special purpose organization based on adaptations of the units described, for example, in the copending applications by Bergland-Klahn or Gilmartin-Shively, supra.

With the numbers assumed for the present discussion (data record $= 2^{18}$ points, fast memories $= 2^{12}$ locations) the decimation process involves the creation of $2^6=64$ files, each of length $2^{12}$, in slow memory 30. Each of these 64 files is brought into fast memory one at a time and transformed in accordance with the bracketed expression in eq. (3). Arithmetic unit 50 and trigonometric function generator 70 combine to produce the transformed results which replace in fast memories 40A and 40B the data from which they were generated. The transformation involves a reordering in accordance with usual FFT practice so that the resulting transformed values appear in storage in order of increasing values of the transformed variable, e.g., frequency. The resulting transforms are then multiplied by the appropriate twiddle factors indicated in eq. (3) and supplied by trigonometric function generator 70.

Analyses of successive 4,096-point files proceed alternately in connection with fast memories 40A and 40B. While the arithmetic operations indicated by eq. (3) (and subsequent reordering) is proceeding in connection with, say, memory 40A, the next file to be processed is being loaded into fast memory 40B. Likewise, memory 40A is loaded while the contents of memory 40B are operated on. Opposing switches 80A and 80B illustrate the alternating access to memories 40A and 40B. Thus a bifurcated fast memory with limited capacity is used to fulfill the memory requirements of steps 1, 2 and 4 of the four main steps enumerated above. This part of the analysis proceeeds at a speed comparable to that available with a fast memory capable of storing all of the input data.

When the last of the 64 4,096-point "twiddled" transforms $Z_{\hat{a}}(b)$has been generated in accordance with eq. (3), the second set of transformations in accord with eq. (2) are begun. These transforms again are performed on data wholly in fast memories 40A and 40B. Each transform involves 64 points, one from each of the sequences $Z_{\hat{a}}(b)$. Thus, a file for purposes of the second set of transforms is formed by selecting a given, *b*th, point from each of the sequences $Z_{\hat{a}}(b)$. Thus 4,096 64-point transforms are performed in turn, the results again replacing the operands in slow memory 30.

Again advantage is taken of the high speed of fast memories 40A and 40B. While a transform is being performed on data in one of these memories, the other one is assembling data for the next 64-point transform. Data for the first 64-point transform is not available until all 64 of the 4,096-point sequences $Z_{\hat{a}}(b)$have been completed. However, while the last of the sequences $Z_{\hat{a}}(b)$ is being computed (based on data stored in, say, memory 40B), all but the last element of the data for the first 64-point transform can be loaded into memory 40A. When the last 4,096-point transform is complete the remaining data required to compute the first 64-point transform can immediately be entered into the appropriate location in memory 40A. Thus, little, if any, time is lost between the completion of the first set of transforms and the beginning of the second set.

Because the second set of transforms involve only 64 points, the time to assembly data for the next 64-point transform may approximate that required to actually perform a 64-point transform. Accordingly, it sometimes proves valuable to assemble more than one 64-point sequence of data to be transformed. Since fast memories 40A and 40B were taken to have $2^{12}$=4,096 locations, and each of the second set of transforms involves only $2^6$=64 locations, data for $2^6$=64 64-point transforms can be assembled in fast memories 40A and 40B. Thus, when 64 sequences of 64 points each can be transferred selectively in one block from slow memory 30 to fast memories 40 faster than 64 separate sequences, additional savings may be realized. Of course if there is ample time to transfer (assemble) a 64-point sequence from slow memory 30 to one of the fast memories 40 while a 64-point transform is performed, no actual reduction in analysis time will be realized. However, it may still be preferred practice to keep fast memories full at all times by transferring blocks of 64-point sequences.

When all 4,096 of the 64-point transforms have been completed and returned to slow store 30, the analysis is complete. The time required is limited almost entirely by the speed of fast memories 40 and the logic circuitry of arithmetic unit 50. The slow memory 30 has presented almost no limitation on the speed of analysis, the exception being its effect on transfer of data to fast memories 40. This exception applies only when the transfer of data needed for a transform takes longer than the actual computation of the transform, and the unscrambling and twiddling when appropriate.

Although the two levels of memory have been characterized as slow and fast, the essential difference between them may be quite unrelated to basic memory speed. That is, one memory (nominally slow) may be accessible only at relatively infrequent intervals, but once accessible it may be able to disgorge large amounts of data in any format at high speed. Such a condition might typically arise in a time-sharing computer system with a large shared main memory that can be accessed only by one user at a time. Another fundamental distinction between the two classes of memory aside from speed might be physical location. Thus, a distant (nominally slow) memory may be fast but the communication link connecting it to the faster memory may be slow.

While memory 30 has been called the slow memory, it may be slow only in the sense that it cannot provide data in the correct format or amounts in a short time. For example, numbers representing input data points may be "packed" together in memory 30. That is, several points may be located at different bit positions of a single stored word in memory 30. This arrangement may be quite unsuitable for calculations involving arithmetic units requiring each point at a specified location. In fact, certain arithmetic organization for performing FFT analysis achieve important speed advantages by having data stored at locations related to the value of one or more of the sample variables, e.g., $t$ or $\hat{t}$. Thus, to require a search through memory for particular values destroys these advantages in many cases.

The numerical values (e.g., fast memory capacity = 4,096) used in the above description of one embodiment of the present invention are typical, they present no fundamental limitation on the invention.

While two levels of storage are shown in the illustrative embodiment of FIG. 1, the present invention is not limited to applications having only 2 levels in a memory hierarchy. Thus, slow memory 30 may comprise 2 or more levels of storage suitably interconnected and arranged to transfer data to memories 40A and 40B as required.

Additionally, fast memory will be divided into more than the two segments 40A and 40B. The method of division in the embodiment described is merely illustrative and represents no limitation on the present invention. Still other methods of transferring data to part of fast memory 40 while computations are proceeding with data stored in another part of memory 30 are available.

Alternatively, fast memory will, in appropriate circumstances comprise but a single segment suitable for storing appropriate subsequences of the type described above. Such circumstances will include those where the time to transfer information from slow memory to fast memory will be small compared to the computation time if slow memory were used exclusively. An example of such a circumstance is one where for purposes of access time it matters little whether a single address in slow memory is accessed or whether many such addresses are accessed simultaneously. A disk memory with a plurality of independent readout transducers or a tape memory with a plurality of redundant tape transports serve as two typical examples. In either case, if slow memory is accessed on an item-by-item basis for computation, the access time will represent a relatively large part of a computation period. Thus, it would be of little value to use a fast memory of the type described when such an access scheme is employed. However, if but a single segment of fast memory is available, and a rapid transfer of data can be accomplished between slow and fast memories, a large advantage within the teachings of the present invention can still be realized.

When real time analyses are to be performed, slow memory 30 may itself be divided into segments to store two or more large blocks of data. One of these segments, typically representing points from the sample interval immediately preceding the present one, is then interacting with memories 40A and 40B in the manner described above. Meanwhile a second segment is accumulating data from the present interval for analysis in the immediate future. During a succeeding sample interval the roles of the segments of slow memory 30 are interchanged.

Numerous variations within the spirit of the present invention will occur to those skilled in the art.

What is claimed is:

1. The method of generating in a hierarchical memory computer the Fourier coefficients corresponding to a sequence of input data signals stored in one level of said hierarchical memory comprising the steps of A. sequentially transferring subsequences of said input data signals to another level of memory, B. generating a subsequence of data signals corresponding to the product of the Fourier transform coefficients of said input subsequences and corresponding twiddle factors, C. transferring said subsequences of product signals to said one level of memory, D. sequentially transferring subsequences of selected ones of said product signals to said other level of memory, and E. generating subsequences of signals corresponding to Fourier transform coefficients of said subsequences of product signals transferred according to step D.

2. The method of claim 1 wherein said subsequences of input data signals are selected by decimating said sequence of input data signals.

3. The method of claim 1 wherein said subsequences of product data signals are generated simultaneously with the selective transfer of a subsequence of said input signals to be used in the formation of a subsequent subsequence of said product signals.

4. The method of claim 1 wherein said selection of said product signals for transfer to said other level of memory is made by selecting corresponding elements from each subsequence of said product signals.

5. The method of claim 4 wherein said subsequences of signals corresponding to Fourier transform coefficients of said product signals are generated while another subsequence of said product signals is being transferred to said other level of memory.

6. In a computer having a hierarchical memory with at least first and second levels of memory the method of generating a sequence of signals representing Fourier transform coefficients corresponding to a sequence of $N=A \cdot B$ input data signals comprising the steps of A. decimating said input sequence by $A$, thereby forming $A$ input subsequences of $B$-points each, B. storing said input subsequences in said first level of memory, C. sequentially performing on each $B$-point input subsequence the steps of 1. transferring said $B$-point input subsequence to said second level of memory,
2. generating data signals corresponding to the Fourier transform of said $B$-point subsequence, thereby forming a $B$-point transformed subsequence of data signals,
3. forming a $B$-point subsequence of data signals corresponding to the product of each transformed data signal with its appropriate twiddle factor,
4. transferring said $B$-point product subsequence data signals to said first level of memory, D. sequentially transferring to said second level of memory each of the $A$-point data signal sequences formed by selecting product data signals from corresponding positions in each $B$-point sequence of product data signals, E. generating data signals corresponding to the Fourier transform of said $A$-point subsequences, and F. transferring said transformed $A$-point subsequence data signals to said first level of memory.

7. Apparatus for generating data signals corresponding to Fourier transform coefficients of a sequence of input data signals comprising A. a first memory for storing signals including said sequence of input signals, B. a second memory having a plurality of segments, each of said segments being arranged to store signals including a subsequence of said sequence of input signals, C. processing means for generating and storing Fourier coefficient data signals corresponding to Fourier transform coefficients corresponding to data signals stored in said second memory, said Fourier coefficient signals being stored as a sequence in a segment of said second memory, D. means for transferring one subsequence of signals from said first memory to one segment of said second memory and one sequence of signals from a segment of said second memory to said first memory while a sequence of said Fourier coefficient signals is being generated corresponding to data signals stored in another segment of said second memory.

8. The apparatus according to claim 7 wherein said processing means comprises an arithmetic unit and a trigonometric function signal generator.

9. The apparatus according to claim 7 further comprising means for generating twiddle factor signals corresponding to each of said Fourier coefficient signals, means for generating signals corresponding to the product of each of said Fourier coefficient signals and a corresponding one of said twiddle factor signals, and means for replacing each of said Fourier coefficient signals by the corresponding one of said Fourier product signals prior to transferring the sequence containing said corresponding product signal to said first memory.

10. The apparatus according to claim 7 further comprising means for selecting signals from said first memory to be transferred to said second memory by decimating said input data signals.

UNITED STATES PATENT OFFICE

CERTIFICATE OF CORRECTION

Patent No. 3,617,720 Dated November 2, 1971

Inventor(s) William M. Gentleman

It is certified that error appears in the above-identified patent and that said Letters Patent are hereby corrected as shown below:

Column 1, line 68, after "et" insert --al--.

Column 2, line 4, change "that" to --than--; and line 13, change "providing" to --proving--.

Column 3, line 2, change "well3known" to --well known--; and line 24, change "(b = 0,1 B-1)" to --(b = 0,1,...B-1)--.

Column 5, line 38, change "assembly" to --assemble--.

Signed and sealed this 27th day of June 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334